United States Patent [19]

Patrick et al.

[11] 4,339,666

[45] Jul. 13, 1982

[54] BLADE PITCH ANGLE CONTROL FOR A WIND TURBINE GENERATOR

[75] Inventors: John P. Patrick, South Windsor, Conn.; Joseph M. Kos, Holyoke, Mass.; Kermit I. Harner, Windsor, Conn.

[73] Assignee: United Technologies Corporation, Hartford, Conn.

[21] Appl. No.: 219,611

[22] Filed: Dec. 24, 1980

[51] Int. Cl.³ .............................................. F03D 9/00
[52] U.S. Cl. ..................................... 290/44; 290/55
[58] Field of Search .................. 290/44, 55; 416/35, 416/154, DIG. 4

[56] References Cited

U.S. PATENT DOCUMENTS 4,160,170  7/1979  Harner et al. ....................... 290/44
4,193,005  3/1980  Kos et al. ........................... 290/44

Primary Examiner—J. V. Truhe
Assistant Examiner—Shelley Wade
Attorney, Agent, or Firm—John Swiatocha

[57] ABSTRACT

A blade pitch angle control for a wind turbine-generator establishing an optimum power or torque reference signal which, when operating conditions so warrant, is not limited by the nominal torque or power ratings of various turbine generator components. The reference signal is indicative of a maximum blade angle setting for safe operation of the wind turbine. An integral or lag compensation circuit for enhanced transient and steady-state operation may be employed.

7 Claims, 1 Drawing Figure

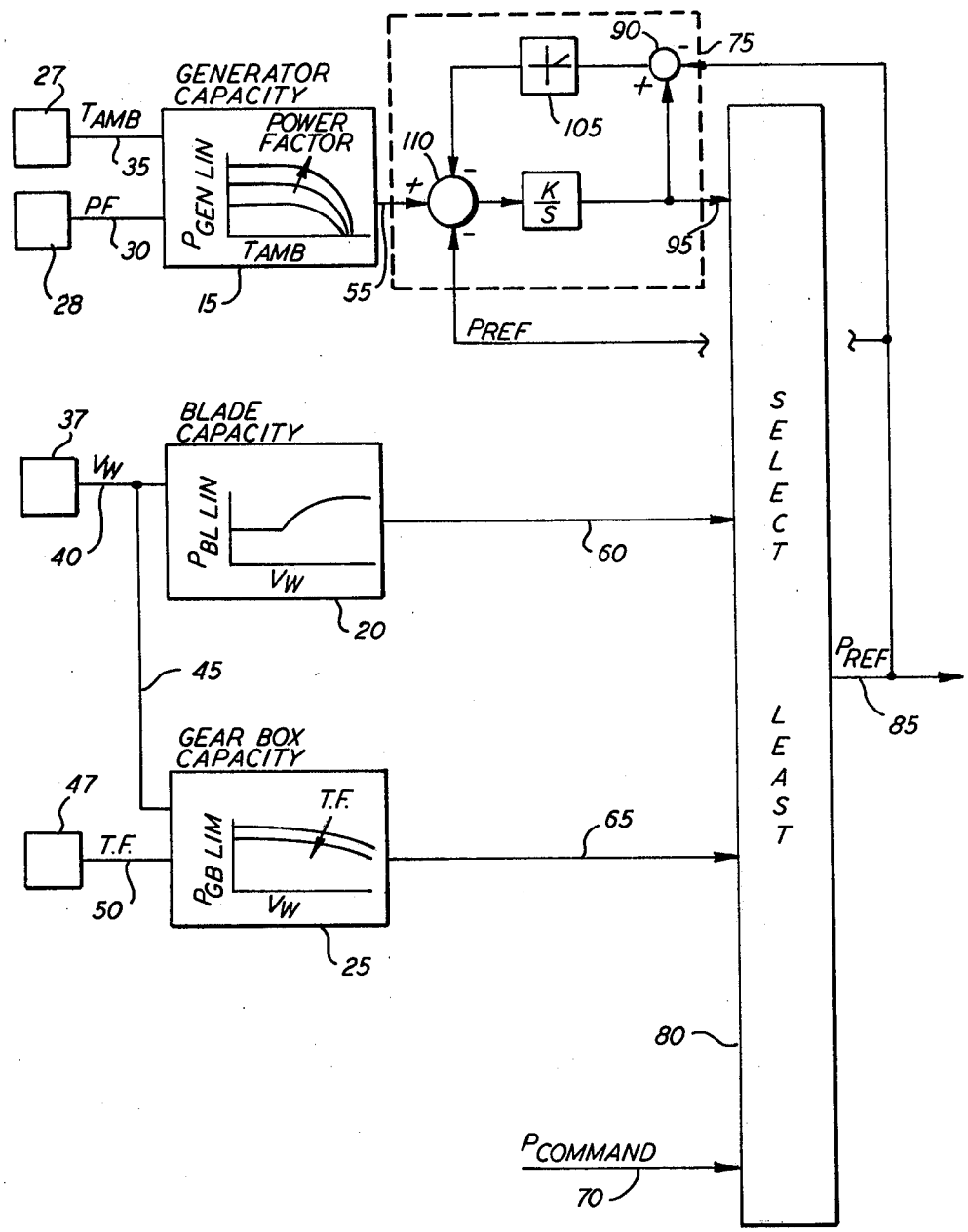

BLADE PITCH ANGLE CONTROL FOR A WIND TURBINE GENERATOR

DESCRIPTION

1. Technical Field

This invention relates to a blade pitch control for horizontal axis wind turbine-generators and particularly to such turbine-generators having a plurality of large, variable pitch airfoil blades mounted on a rotor which drives a synchronous generator through a gear box.

2. Background Art

Modern, large, horizontal axis wind turbine-generators generally include a plurality of variable pitch blades mounted on a rotor which drives a synchronous generator through a gear box. The gear box steps up the rotational speed of the main turbine shaft to the speed required for synchronous operation of the generator.

The blades, gear box and generator are capable of handling only limited amounts of torque or power input thereto. Thus, in the control of such modern, large wind turbine-generators, as for example taught in U.S. Pat. No. 4,193,005 to Kos et al, to protect the turbine blades, blade mounts, gear set, generator and other system components, wind energy or power captured by the blades and the resulting torque applied to the main turbine-generator shaft are limited to safe amounts by pitch angle adjustment of the turbine airfoil blades. To so limit power and torque transmission within the wind turbine-generator, the blade pitch control system therefor must be provided with, or itself generate, a signal indicative of the maximum power or torque handling capacity of the above noted turbine-generator components. In the hereinabove cited Kos et al patent, such a desired torque signal, otherwise known as a torque reference signal, is obtained from a torque or function generator (144) wherein numerical values of nominal torque are stored as a function of wind velocity, whereby a wind velocity input to the schedule yields a corresponding torque output reference signal from the schedule.

The reference torque values stored in signal generator 144 have heretofor been determined on the basis of the nominal ratings of the turbine blades, generator and gear box, the determination of these nominal ratings being based on operation of these components under electrical load and climactic conditions generally adverse to maximum power or torque transmission. Thus, function generator 144 limits the reference power or torque signal, and therefore generator output, to a value which is safe under relatively adverse operating conditions even when actual operating conditions are favorable to maximum power or torque transmission by the blades, gear box and generator and hence, favorable to maximum generator electrical output.

With respect to the wind turbine blades, it has been determined that blade stresses are highest at "rated" wind velocity (the lowest wind velocity at which rated power is generated) wherein blade pitch is set for maximum energy capture. Above rated velocity, the blades are adjusted in pitch such that the thrust on the blades is reduced, "spilling" substantial amounts of wind from the blades. Such pitch adjustment has the effect of lowering blade stresses from those which exist at rated velocity.

The maximum permissible electrical output of a synchronous generator is dependent on such factors as load power factor, and the capacity to cool the generator which in turn depends on ambient temperature and air density (altitude). The output of the generator is a function of the load and the torque input to the generator. The maximum permissible electrical output of the generator increases with an increase in load power factor and with enhanced cooling capability. Thus, for a given generator site (altitude) at high load power factors and/or low ambient temperatures, the generator may be operated at higher than nominal torque input to the rotor and therefore, higher than nominal electrical power output to the load.

Generally, the gear box employed in the wind turbine-generator is also rated at a nominal torque input or power handling capacity. The torque input to the gear box is in turn, determined by the torque output of the wind turbine rotor under both steady state and gusting conditions. It has been the practice to nominally rate such gear boxes at a certain steady state torque input, the gear box being designed to withstand greater, approximated transient torques from gusting. Such transient torques are generally assumed to be in the neighborhood of 140% rated torque. It has been determined that when the gusting actually encountered is of lesser magnitude, frequency and duration than anticipated, the gear box may be operated in steady state with greater than nominal torque input thereto, thereby resulting in greater than nominal generator electrical output.

From the above, it will be understood that under certain conditions, i.e. low ambient temperature, high power factor, and low wind turbulence factor, with an average wind velocity above rated velocity, the wind turbine-generator may be safely operated at higher than the nominal power or torque ratings of the turbine blades, gear box, or generator reflected by a prior art reference signal schedule. Operation at such higher than rated power or torque levels, of course, increases the electrical output of the turbine-generator thereby reducing the unit cost of electrical energy produced thereby.

DISCLOSURE OF INVENTION

Objects of the present invention include establishing an optimum power of torque reference signal for a wind turbine-generator control system based on actual operating conditions of the turbine-generator.

In accordance with the present invention, signals indicating maximum generator, blade and gear box power or torque handling capacities under wind, temperature and power factor operating conditions and a command signal indicative of desired generator output power, are compared to one another, the power or torque signal of lowest magnitude being selected as the power or torque reference signal. This reference signal is subsequently provided to a blade pitch control system to establish pitch positions at which the turbine generator output corresponds to the reference signal. In one embodiment of the present invention, one or more of the maximum generator, blade and gear box power, capacity signals are fed to a lag compensation circuit which includes integral compensation means to smooth out the signal and enhance the accuracy thereof. The lag compensation circuit also includes means limiting the error between the output of the integral compensation means and the system's output reference signal to a value which prevents excessive operation of the integral compensation means when the reference signal is limited by a power capability signal other than that with which the lag compensation circuit is associated.

The foregoing, and other objects, features and advantages of the present invention will become more apparent from the following description taken in connection with the accompanying drawing.

BRIEF DESCRIPTION OF THE DRAWING

The sole FIGURE is a schematic diagram of a preferred embodiment of the wind turbine-generator blade pitch control of the present invention.

BEST MODE FOR CARRYING OUT THE INVENTION

Referring to the drawing, the control 10 of the present invention includes means such as digital data look up memories or analog function generators 15, 20, 25 for establishing signals indicative of power handling capabilities of the wind turbine-generator gear box, blades, and generator as functions of the turbine-generator operating conditions. While the control system is described with regard to such memories, it will be understood that corresponding torque function memories may also be employed without departing from the present invention, numerical values of torque being readily converted to power and vice versa. Therefore, hereinafter, reference to a power signal shall be understood to be reference to either a power or a torque signal.

The generator memory 15 stores generator power handling capability as a function of both load power factor (P.F.) and ambient temperature $T_{AMB}$ input signals for a given altitude, it being understood that as detailed hereinabove, the generator power handling capacity increases with increasing power factor and decreasing ambient temperature. The power factor and temperature signals are provided by suitable transducers such as a thermocouple 27 and power factor meter 28, and input to memory 15 through lines 30 and 35, respectively. Blade memory 20 provides a signal indicative of blade power handling capacity (limited by allowable blade stress) as a function of an average wind velocity signal obtained from a transducer 37 such as a wind meter, and input to the memory through line 40. Gear box function generator or memory 25 provides an output indicative of power handling capability of the gear box as a function of both average wind velocity ($V_W$) and wind turbulence factor (T.F.) input signals. The wind velocity signal may be obtained from line 40 and input to memory 25 through line 45. The turbulence factor signal indicative of the magnitude of wind turbulence (gusting) is provided by suitable apparatus 47 which makes repeated measurements of wind velocity and calculates a turbulence factor based on measured gusts and calculated average wind velocities. This signal is input to memory 20 through line 50. As described hereinabove, blade stresses decrease when wind is allowed to "spill" therefrom thereby reducing the resultant thrust on the blades. Thus, at wind velocities greater than rated velocity, the blade stresses are lower than those at rated velocity, and therefore, the blades are capable of capturing increased amounts of wind power without establishing excessive internal stress. As indicated by memory 25, as turbulence decreases, the steady state power or torque handling capability of the gear box increases. Thus, it is noted that under certain favorable wind, temperature and power factor conditions, memories 15, 20 and 25 provide power signals indicative of power capacity substantially greater than any of the nominal ratings of the blades, gear box or generator.

The output signals from memories 15, 20 and 25 are applied to lines 55, 60 and 65, respectively. Occasionally, as for example during start-up of the wind turbine-generator, when the wind turbine must be brought up to speed gradually, a reference signal of less than maximum value is required. To achieve such control, a command power signal is input to the system of the present invention through line 70.

Assuming for purposes of discussion, that the circuit enclosed by dotted line 75 is not included in the present invention, the output signals from memories 15, 20 and 25 and the command power signal are fed to a select least circuit 80, which selects the least of these four signals and passes that least signal as output reference signal 85. As set forth hereinabove, this signal is indicative of a blade pitch angle to which the wind turbine blades are set to achieve an output power corresponding to this reference signal. Select least means may comrise any suitable component or circuit such as a first set of comparators which compare the value of one of the signals to the values of the others and a second set of comparators which compare the outputs of the first set of comparators, together with gates, one of which is activated by the comparators to pass the signal of least value as the output of the select least circuit.

In operation, assuming that the maximum possible output is desired from the wind turbine-generator, the command signal will be of greater value than the maximum allowable power or torque signals from memories 15, 20 and 25. Assuming a moderately high average wind velocity, high load power factor and relatively low wind turbulence factor, it will be seen that the turbine blades and generator will be capable of power inputs substantially in excess of the minimal rating of those components. Likewise, the low turbulence factor, allows a greater than nominal power input to the gear box. Thus, the wind turbine-generator may be safely operated at higher than nominal power inputs to the blades, gear box and generator, and can therefore, be operated at higher than rated electrical power output. Assuming that wind conditions are such that the power input limit to the gear box is reached before any of the torque or power input limits to the other components are reached, the signal from gear box memory 25, will be less than the output signals from the other components and less than the command signal. Accordingly, least select means selects the gear box signal and passes that signal as the output reference signal. This reference signal is fed to that portion of the wind turbine generator control system (not shown) which sets the blade pitch to a position corresponding to an actual wind turbine generator output power substantially equal to that called for by the reference signal. Thus, it is noted that under certain favorable wind, temperature and power factor conditions, when called for, the control system of the present invention can set a power reference signal substantially greater than any of the nominal ratings of the blades, gear box or generator thereby maximizing the electric energy produced by the turbine-generator.

The outputs of memory 15 may be fed to an integral or lag compensation circuit 75, it being understood that similar lag compensation circuits may be connected to the outputs of memories 20 and 25 in similar fashion. The lag compensation circuit comprises a first summing junction or difference circuit 90 which takes the difference between the output reference signal 85 of least select means 80 and the output of the lag compensation circuit (line 95) and provides as an output thereof at line 100, a first error signal proportional to that difference. This output of summing junction 90 is fed to limiter 105 which limits the value of the first error signal. As the graphical diagram on the limiter signal indicates, in a dead band, below a predetermined error (in the preferred embodiment, a set percentage such as 5% of rated wind turbine-generator output power) the limiter output is zero. Above this dead band the limiter output is a set fraction of the value of the first error signal as determined by the limiter gain. The output of limiter 105 is fed to a second summing junction 110 which takes the difference between the sum of the output of limiter 105 and output reference signal 85 and the output of the associated memory, in this case, memory 15. The output signal from second summing junction 110 is fed to integrator 115, the integrator providing integral compensation to enhance the accuracy of, and smooth out the output signal from the memory.

The operator of the integral or lag compensation circuit is as follows. When output reference signal 85 is determined by a signal originating from other than function generator 15, summing junction 90 provides an error signal proportional to the difference between the output of integrator 115 and output reference signal 85. Without limiting means 50, a substantial difference between the reference output signal 85 and the output of integrator 115 or, when applied to second summing junction 110, could, with the output from memory 15 and reference signal 85, define a large second error signal triggering integrator 115 and causing continued, yet unnecessary integration by that component, in turn causing further continued magnification of the error signals. Limiter 105 limits the error between the integrator output and reference signal 85 in the manner described hereinabove, offsetting any difference between the output of memory 15 and output reference signal 85. This reduces the output of summing junction 110 to zero or a value which suitably limits the operation and hence the output of integrator 115.

As set forth hereinabove, while the lag compensation circuit is shown in conjunction with generator power handling capability function generator 15, it will be understood that similar lag compensation circuits may be employed with both blade and gear box memories 20 and 25 in a similar manner.

The invention herein may be implemented with either analog or digital apparatus or a combination thereof wherein conversion of signals from analog to digital and vice versa is contemplated. Furthermore, while outputs of function generators or memories 15, 20 and 25 are described as being functions of temperature, power factor, turbulence factor and wind velocity, it will be understood that the outputs of these components may be determined as functions of other parameters such as parameters by which the hereinabove noted temperature, power factor, turbulence factor and wind velocity parameters may be calculated.

Although this invention has been shown and described with respect to detailed embodiments thereof, it will be understood that various modifications in form and detail will suggest themselves to those skilled in the art, and it is intended by the appended claims to cover such modifications as come within the true spirit and scope of this invention.

We claim:

1. A blade pitch angle control for a wind turbine-generator having power components including a variable pitch blade rotor driving an electric generator through a gear set, said control comprising means for providing a wind velocity signal indicative of average present wind velocity, and signal processing means responsive to said wind velocity signal for providing a power reference signal indicative of the desired blade pitch angle for said wind turbine generator to withstand wind at the velocity indicated by said wind velocity signal, characterized by:

means providing a turbulence factor signal indicative of the degree to which the present instantaneous wind velocity may exceed the present average wind velocity; and said signal processing means being responsive to said turbulence factor signal for providing a gear set capacity signal as a function of said wind velocity signal and said turbulence factor signal indicative of the desired blade pitch angle for said rotor to safely drive said gear set in response to maximum likely wind velocities indicated by said wind velocity signal and said turbulence factor signal, said signal processing means being further responsive to said wind velocity signal for providing a blade capacity signal as a function of said wind velocity signal indicative of the desired blade pitch angle for said rotor to safely accommodate said wind velocities indicated by said wind velocity and said turbulence factor signal, said signal processing means providing said power reference signal indicative of desired blade pitch angle as a function of a selected one of said blade capacity signal and said gear set capacity signal to provide a power reference signal indicative of the largest allowable blade pitch angle for safe operation of said rotor and gear box.

2. A control according to claim 1 further characterized by:

generator condition means for providing a condition signal indicative of the present magnitude of a variable parameter which affects the load handling capacity of said electric generator; and said signal processing means being responsive to said condition signal for providing a generator capacity signal indicative of the desired blade pitch angle for said rotor to safely drive said generator, and for providing said power reference signal as a function of a selected one of said blade capacity signal, said gear set capacity signal and said generator capacity signal to provide a power reference signal indicative of the largest blade pitch angle allowable for safe operation of said rotor gear box and generator.

3. A control according to claim 2 further characterized by:

said generator condition means providing said condition signal indicative of generator ambient temperature.

4. A control according to claim 2 further characterized by:

said generator condition means providing said condition signal indicative of generator output power factor.

5. A control according to claim 4 further characterized by:

said generator condition means providing a second condition signal indicative of generator ambient temperature, and said signal processing means comprising means for providing said generator capacity signal in combined response to said condition signals.

6. A control according to claims 1, 2, 3, 4 or 5 further characterized by:
   said signal processing means providing said power reference signal as a selected one of
   (A) an integral signal as a function of the time integral of the difference between one of said capacity signals and said power reference signal and
   (B) another one of said capacity signals.

7. A control according to claim 6 further characterized by:
   said signal processing means providing said integral signal as the time integral of the difference between
   (1) one of said capacity signals and
   (2) the sum of
      (a) said power reference signal and
      (b) a limited portion above threshold magnitude of the difference between
         (i) said integral signal and
         (ii) said power reference signal.

* * * * *